Patented Feb. 25, 1941

2,233,279

UNITED STATES PATENT OFFICE 2,233,279

PROCESS FOR CONCENTRATING VITAMIN PREPARATIONS

Stefan Ansbacher, Highland Park, Erhard Fernholz, Princeton, and Mildred Louise Moore, Maplewood, N. J., assignors to E. R. Squibb & Sons, New York, N. Y., a corporation of New York No Drawing. Application November 16, 1938, Serial No. 240,706

11 Claims. (Cl. 167—81)

This invention relates to the concentration and/or purification of vitamin K.

Vitamin K is the fat-soluble blood-clotting factor or group of factors which cures the hemorrhagic diathesis of the chick resulting from a diet rendered fat-free by extraction with ether and supplemented by a cod-liver oil rich in vitamins A and D. It has priorly been obtained from natural sources thereof, notably alfalfa, by concentration procedures, but these procedures have been characterized by complexity and relative inefficiency. Thus, Almquist has disclosed [J. Biol. Chem., 120, 635 (1937)] a method of concentrating vitamin K which involves removal of inert material from a vitamin K concentrate by adsorption of the former on Lloyd's reagent, a highly adsorptive clay; but this treatment, as indicated by Dam and Lewis [Biochem. J. 31, 17 (1937)] and as now confirmed, results in destruction of most of the active material. The investigations of Dam and Lewis [ibid.] led to the conclusion that although vitamin K is absorbed by some adsorbents, it is either destroyed or cannot be recovered from the adsorbate, and hence cannot be concentrated by an adsorption procedure.

It is the object of this invention to provide a simple and efficient process for concentrating and/or purifying vitamin K.

It has been found that highly-active concentrates of vitamin K may be obtained by a process essentially comprising: adsorption of the vitamin on an adsorbent having a non-alkaline reaction, preferably a charcoal having an acid reaction, and elution of the adsorbate with a pyridine (e. g., pyridine, alkyl-pyridines, and benzo-pyridines). The adsorption is effected by contacting the adsorbent with a solution of the vitamin K preparation to be concentrated, preferably a solution in ether, for a short time. Preferably the adsorption and elution are carried out as rapidly as possible, since loss of active material occurs if the time is unduly prolonged. By this process a concentrate having a higher total potency than the starting material may be obtained, the gain in potency being presumably due to removal of substances interfering with the biological activity of the vitaminic material. The concentrate so obtained may be further purified by repetition of this adsorption and elution procedure and/or by high-vacuum distillation.

Notable among the adsorbents utilizable in the practice of this invention are the activated carbons having an acid reaction, prepared by heat-treating a vegetable carbon (e. g., wood charcoal or lignite) and leaching with acid to remove acid-soluble materials, and identified by the trade names Norit and Darco, e. g. Norit A, Darco G–60, Darco S–51, Darco K, and especially Darco E–40, which is a carbon activated for the removal of simple compounds, such as phenol, and for the correction of flavor in wine. Among the pyridines utilizable for the purpose of this invention are the picolines, lutidines, quinoline, and notably pyridine.

The unit of potency referred to hereinafter is defined as the minimum amount of the coagulation factor or group of factors necessary to render the clotting power of the blood of the vitamin-K-deficient chick normal within six hours after the oral administration in 0.1 ml. of cod-liver oil by pipette, as described in Science 88, 221 (1938).

The following examples are illustrative of the invention:

Example 1

(a) 12.37 g. of a vitamin K preparation having a potency of 800 units/g. and hence a total potency of 9896 units (obtained, for example, by the extraction of alfalfa in the usual manner) is dissolved in 100 ml. of ether, 12 g. of Darco K is added, and the mixture agitated for not more than about 5 minutes. The adsorbate is then immediately separated from the liquid phase by filtering with suction, and washed with ether until the washings are practically colorless; the washed adsorbate is immediately eluted with pyridine on a suction funnel, the elution being continued until a practically colorless eluate is obtained; the combined pyridine eluates are diluted with water and extracted with ether; and the ether extract is washed with water and dilute hydrochloric acid in order to remove all traces of pyridine. The entire procedure to this point is carried out in less than about 30 minutes. On evaporation of the ether, a residue weighing about 2.7 g. is obtained, having a potency of 4000 units/g. (and hence a total potency of 10,800 units).

(b) The 2.7 g. residue may be further concentrated by vacuum distillation (160–180° C. at $10^{-5}$ mm.); or the ether solution of the vitaminic concentrate may again be treated with an activated carbon having an acid reaction and the adsorbate eluted as described above (the procedure being repeated as long as economical), and the resulting concentrate purified by vacuum distillation.

Example 2

(a) 102 g. of the vitamin K preparation used in Example 1 (having a total potency of 81,600 units) is dissolved in 1 liter of ether, 100 g. of Darco G-60 is added, and the procedure of Example 1 (a) repeated. A residue weighing 23 g. is obtained, having a potency of 4000 units/g. (and hence a total potency of 92,000 units).

(b) The 23 g. residue is further concentrated by dissolving it in 250 ml. of ether, adding 23 g. of Darco G-60, and repeating the procedure detailed in Example 1 (a); a residue weighing 10.9 g. is obtained, having a potency of 8000 units/g. (and hence a total potency of 87,200 units).

*Example 3*

4.7 g. of the vitamin K preparation used in Example 1 (having a total potency of 3,760 units) is dissolved in 100 ml. of ether, 9.4 g. of Darco E-40 is added, and the procedure of Example 1 (a) repeated. A residue weighing 445 mg. is obtained, having a potency of 8000 units/g. (and hence a total potency of 3560 units).

*Example 4*

20 g. of the vitamin K preparation used in Example 1 (having a total potency of 16,000 units) is dissolved in 200 ml. ether, 30 g. Darco E-40 is added, and the procedure of Example 1 (a) repeated, except that the total time from the contact of the vitamin preparation with the adsorbent to the extraction of the pyridine eluate with ether is reduced to 15 minutes. A residue weighing 1.7 g. is obtained, having a potency of 10,000 units/g. (and hence a total potency of 17,000 units).

The invention may be variously otherwise embodied—as by employing a centrifuge in place of the suction filter to separate the adsorbate—within the scope of the appended claims.

We claim:

1. In a process for concentrating vitamin K preparations, the step of contacting a solution of the preparation with an activated carbon having an acid reaction in amount substantially sufficient to adsorb the vitamin-K content of the preparation.

2. In a process for concentrating vitamin K preparations, the step of contacting a solution of the preparation with a charcoal having an acid reaction in amount substantially sufficient to adsorb the vitamin-K content of the preparation.

3. In a process for concentrating vitamin K preparations, the step of contacting an ether solution of the preparation with a charcoal having an acid reaction in amount substantially sufficient to adsorb the vitamin-K content of the preparation.

4. In a process for concentrating vitamin K preparations, the step of contacting an ether solution of the preparation with an activated carbon having an acid reaction in amount substantially sufficient to adsorb the vitamin-K content of the preparation, the activated carbon being prepared by heat-treating a vegetable carbon and leaching it with acid to remove acid-soluble materials.

5. In a process for concentrating vitamin K preparations, the step of contacting an ether solution of the preparation with an activated carbon in amount substantially sufficient to adsorb the vitamin-K content of the preparation, the carbon being activated for removal of phenol and correction of flavor in wine.

6. The process for concentrating vitamin K preparations which comprises contacting for a short time a solution of the preparation with a charcoal having an acid reaction in amount substantially sufficient to adsorb the vitamin-K content of the preparation, separating the adsorbate from the liquid, and eluting the adsorbate with a pyridine.

7. The process for concentrating vitamin K preparations which comprises contacting for a short time a solution of the preparation with a charcoal having an acid reaction in amount substantially sufficient to adsorb the vitamin-K content of the preparation, separating the adsorbate from the liquid, and eluting the adsorbate with pyridine.

8. The process for concentrating vitamin K preparations which comprises contacting a solution of the preparation with an activated carbon having an acid reaction in amount substantially sufficient to adsorb the vitamin-K content of the preparation, eluting the adsorbate with pyridine, contacting the eluate with water and ether, evaporating the ether from the ether extract, and distilling the residue under a high vacuum.

9. The process for concentrating vitamin K preparations which comprises contacting a solution of the preparation with an activated carbon having an acid reaction in amount substantially sufficient to adsorb the vitamin-K content of the preparation, eluting the adsorbate with pyridine, transferring the vitaminic concentrate from the eluate to ether solution, and repeating the adsorption and elution steps until the desired concentration has been attained.

10. The process for concentrating vitamin K preparations which comprises contacting a solution of the preparation with an activated carbon having an acid reaction in amount substantially sufficient to adsorb the vitamin-K content of the preparation, eluting the adsorbate with pyridine, transferring the vitaminic concentrate from the eluate to ether solution, repeating the adsorption and elution steps until the desired concentration has been attained, and distilling the concentrate under a high vacuum.

11. The process for concentrating vitamin K preparations which comprises effecting, as rapidly as possible, the steps of adsorbing a vitaminic concentrate on a charcoal having an acid reaction in amount substantially sufficient to adsorb the vitamin-K content of the preparation, eluting the adsorbate with a pyridine, and transferring the vitaminic concentrate from the eluate to ether solution.

STEFAN ANSBACHER.
ERHARD FERNHOLZ.
MILDRED LOUISE MOORE.